United States Patent
Mullaney et al.

(10) Patent No.: US 7,428,366 B2
(45) Date of Patent: Sep. 23, 2008

(54) OPTICAL FIBER TERMINATION APPARATUS WITH CONNECTOR ADAPTOR AND METHOD FOR USING THE SAME

(75) Inventors: Julian Mullaney, Raleigh, NC (US);
Roy Keller Thompson, Apex, NC (US);
William Alan Carrico, Raleigh, NC (US); Michael Eugene Grice, Raleigh, NC (US)

(73) Assignee: Tyco Electronics Corporation, Middletown, PA (US)

( * ) Notice: Subject to any disclaimer, the term of this patent is extended or adjusted under 35 U.S.C. 154(b) by 0 days.

(21) Appl. No.: 11/302,629

(22) Filed: Dec. 14, 2005

(65) Prior Publication Data

US 2006/0133758 A1    Jun. 22, 2006

Related U.S. Application Data

(60) Provisional application No. 60/638,866, filed on Dec. 22, 2004.

(51) Int. Cl.
*G02B 6/00* (2006.01)
(52) U.S. Cl. ..................... 385/139
(58) Field of Classification Search ............... 385/139
See application file for complete search history.

(56) References Cited

U.S. PATENT DOCUMENTS

| | | | | |
|---|---|---|---|---|
| 5,231,687 A * | 7/1993 | Handley | ................. | 385/139 |
| 5,348,487 A * | 9/1994 | Marazzi et al. | ............. | 439/138 |
| 5,535,139 A * | 7/1996 | Barringer et al. | ........... | 356/73.1 |
| 5,781,686 A * | 7/1998 | Robinson et al. | ............ | 385/135 |
| 5,984,531 A * | 11/1999 | Lu | ............... | 385/60 |
| 6,104,855 A * | 8/2000 | Jeon | ........................... | 385/139 |
| 6,116,789 A * | 9/2000 | Mrakovich et al. | ............ | 385/59 |
| 6,154,597 A * | 11/2000 | Roth | .......................... | 385/139 |
| 6,181,865 B1 * | 1/2001 | Saviano | ....................... | 385/139 |
| 6,186,670 B1 * | 2/2001 | Austin et al. | .................. | 385/55 |
| 6,247,849 B1 * | 6/2001 | Liu | ............... | 385/55 |
| 6,464,405 B2 * | 10/2002 | Cairns et al. | .................. | 385/56 |
| 6,526,210 B1 * | 2/2003 | Harrison et al. | ............. | 385/134 |
| 6,597,832 B2 * | 7/2003 | Cheng | ......................... | 385/25 |
| 6,721,484 B1 * | 4/2004 | Blankenship et al. | ........ | 385/135 |
| 6,807,355 B2 * | 10/2004 | Dofher | ........................ | 385/134 |
| 6,863,445 B2 * | 3/2005 | Ngo | ........................... | 385/55 |
| 6,915,058 B2 * | 7/2005 | Pons | .......................... | 385/135 |
| 7,239,789 B2 * | 7/2007 | Grubish et al. | ............. | 385/135 |
| 2003/0031452 A1 * | 2/2003 | Simmons et al. | ............ | 385/147 |
| 2003/0063866 A1 * | 4/2003 | Melton et al. | ................. | 385/76 |

* cited by examiner

*Primary Examiner*—Ellen Kim
(74) *Attorney, Agent, or Firm*—Myers Bigel Sibley & Sajovec (57) ABSTRACT

An optical fiber termination apparatus includes a housing defining an optical fiber receiving chamber and having a connector adaptor receiving opening. A connector adaptor is positioned in the connector adaptor receiving opening. The connector adaptor has a connector opening therein extending from outside the housing to the optical fiber receiving chamber. The connector opening is configured to mate with a connector of a predetermined connector type. Methods of terminating optical fiber using optical fiber termination apparatus are also provided.

20 Claims, 11 Drawing Sheets

OPTICAL FIBER TERMINATION APPARATUS WITH CONNECTOR ADAPTOR AND METHOD FOR USING THE SAME

RELATED APPLICATIONS

The present application claims priority from U.S. Provisional Application No. 60/638,866, filed Dec. 22, 2004, the disclosure of which is hereby incorporated herein in its entirety by reference.

BACKGROUND OF THE INVENTION

The present invention relates to communication cable termination devices and, more particularly, to optical fiber termination apparatus and methods for using the same.

An extensive infrastructure supporting telecommunication has been developed, traditionally based upon copper wire connections between individual subscribers and telecommunications company network distribution points. More recently, much of the telecommunications network infrastructure is being extended or replaced with an optical fiber based communications network infrastructure. The carrying capacity and communication rate capabilities of such equipment may exceed that provided by conventional copper wired systems. However, this cable based infrastructure is generally required to be flexibly field installed to allow for additions and deletions of service at access points as the customer mix for a telecommunications provider changes. Accordingly, subscriber optical fiber drop cable access points are typically required for configuring the network to provide services to different customers, For the optical fiber infrastructure, it is generally desirable to provide sealed environmental protection and flexible incremental connection of subscriber drop cables to provide for rapid and reduced cost deployment of services to different customers. A variety of different products are available for use at access points in optical fiber-based communications networks. For example, the OptiSheath™ Advantage Terminal, available from Corning Incorporated of Corning, N.Y., is available with customer options to accommodate add-as-you-grow applications. The OptiSheath™ is available in six, eight or twelve port customer options, which may be utilized for aerial or buried terminal use in an optical access architecture allowing for subscriber connection. Cables of varying lengths may be preterminated inside the factory for use in the OptiSheath™ Advantage Terminal and the multiport options may allow for configuration in the field of each terminal location based on customer take length and stub length. The actual connection point in the OptiSheath™ Advantage Terminal utilizes a specific tap and drop cable specification to provide for the actual subscriber drop cable installation at the OptiSheath™ Advantage Terminal. In particular, the Opti-Tap™ Connector is included in the OptiSheath™ Advantage Terminal and the OptiFit™ Drop Cable may be removably coupled through the OptiTap™ to link subscribers to the optical fiber communications network. Utilization of such a standard connector type infrastructure may provide for rapid installation of fiber optic cables. However, there is a risk with such a configuration that a loss of environmental seal on any one port may expose other ports within a terminal to environmental contamination and associated degradation.

SUMMARY OF THE INVENTION

Embodiments of the present invention include an optical fiber termination apparatus having a housing defining an optical fiber receiving chamber and having a connector adaptor receiving opening. A connector adaptor is positioned in the connector adaptor receiving opening. The connector adaptor has a connector opening therein extending from outside the housing to the optical fiber receiving chamber. The connector opening is configured to mate with a connector of a predetermined connector type.

In other embodiments of the present invention, a seal member is positioned between an inner wall of the housing and the connector adaptor to seal a gap therebetween. The connector or a removable closure member may be positioned in the connector opening to close the connector opening.

In further embodiments of the present invention, a removable attachment member retains the connector adaptor in the connector adaptor receiving opening. The removable attachment member may be a spring member and the housing and the connector adaptor may each have an opening therein for receiving the spring member. The opening in the connector adaptor may be a first channel in an outer surface thereof and a second channel in the outer surface thereof on an opposite side of the connector adaptor.

In other embodiments of the present invention, the optical fiber receiving chamber is configured to receive and retain a loop of optical fiber at a bend radius exceeding a minimum bend radius of the optical fiber. The optical fiber receiving chamber may be configured to receive a length of the optical fiber sufficient to allow removal of the connector adaptor from the housing to allow access to a back fiber connection member of the connector while retaining the loop of optical fiber at a bend radius exceeding the minimum bend radius of the optical fiber. The housing may include an optical fiber receiving opening therein extending into the optical fiber receiving chamber.

In further embodiments of the present invention, an optical fiber termination assembly includes a plurality of housings, each having a connector adaptor and an optical fiber receiving opening and an optical junction box. An optical fiber tube extends from the optical fiber receiving opening of each of the housings to the optical junction box. An optical fiber extends through each of the optical fiber tubes between the optical junction box and the plurality of housings. An optical fiber splice member in the optical junction box is configured to optically couple the optical fibers to respective source optical fibers extending into the optical junction box. The optical fiber splice member may be an optical fiber splice tray. An optical fiber termination connector may be provided on an end of the optical fiber in each of the plurality of housings, which is configured to releasably couple to the back fiber connection member. A sealant may be positioned in each of the tubes between the respective housings and the optical junction box.

In other embodiments of the present invention, the connector positioned in the connector opening has a closable front fiber connection member on a face thereof extending from the housing and the optical fiber receiving chamber is environmentally sealed when the front fiber connection member is closed. For each housing, a seal member may be positioned between the connector and the connector opening and a seal may be positioned between the optical fiber tube and the optical fiber receiving opening and the optical fiber receiving chamber may thereby be environmentally sealed by the seal member positioned between the connector and the connector opening, the seal between the optical fiber tube and the optical fiber receiving opening and the sealant in the optical fiber tube. Opening the front fiber connection member on the connector of one of the housings in some such embodiments will not break the environmental seal for other of the housings.

The seal between the optical fiber tube and the optical fiber receiving opening may be an adhesive and the seal member positioned between the connector and the connector opening may be an O-ring.

In yet further embodiments of the present invention, each of the housings is configured to receive only a single connector. The respective source optical fibers extending into the optical junction box may be from an optical drop cable coupled to an optical distribution source.

In other embodiments of the present invention, optical fiber termination kits are provided. The kits include an optical fiber termination apparatus as described above and a second connector adaptor having a connector opening configured to mate with a connector of a second predetermined connector type different from the predetermined connector type of the optical fiber termination apparatus.

In further embodiments of the present invention, methods of terminating optical fiber include routing an optical fiber from a main distribution line to an optical fiber termination apparatus housing. A desired connector type for terminating the routed optical fiber is selected. A connector of the selected connector type is installed in a connector adaptor having a connector opening therein configured to mate with the selected connector type. The routed optical fiber is coupled to a back fiber connection member of the connector and the connector adaptor is installed in the housing.

In yet other embodiments of the present invention, routing an optical fiber includes routing the optical fiber from the main distribution line to an optical junction box and splicing the optical fiber from the main distribution line to a termination optical fiber in the optical junction box. The termination optical fiber is routed to the optical fiber termination apparatus housing. A plurality of optical fibers may be routed from the main distribution line to the optical junction box and spliced to respective termination optical fibers and respective ones of the termination optical fibers may be routed to different optical fiber termination apparatus housings to provide a multi-drop connection from the main distribution line. Environmental sealing may be provided in the routing of the respective termination optical fibers configured so that breach of the environmental sealing for one of the termination optical fibers will not break the environmental sealing for other of the termination optical fibers.

In further embodiments of the present invention, routing an optical fiber includes separating a plurality of optical fibers from the main distribution line and singulating the respective separated optical fibers. Respective ones of the singulated optical fibers are routed to different optical fiber termination apparatus housings to provide a multi-drop connection from the main distribution line.

DETAILED DESCRIPTION

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figures 1, 1A:
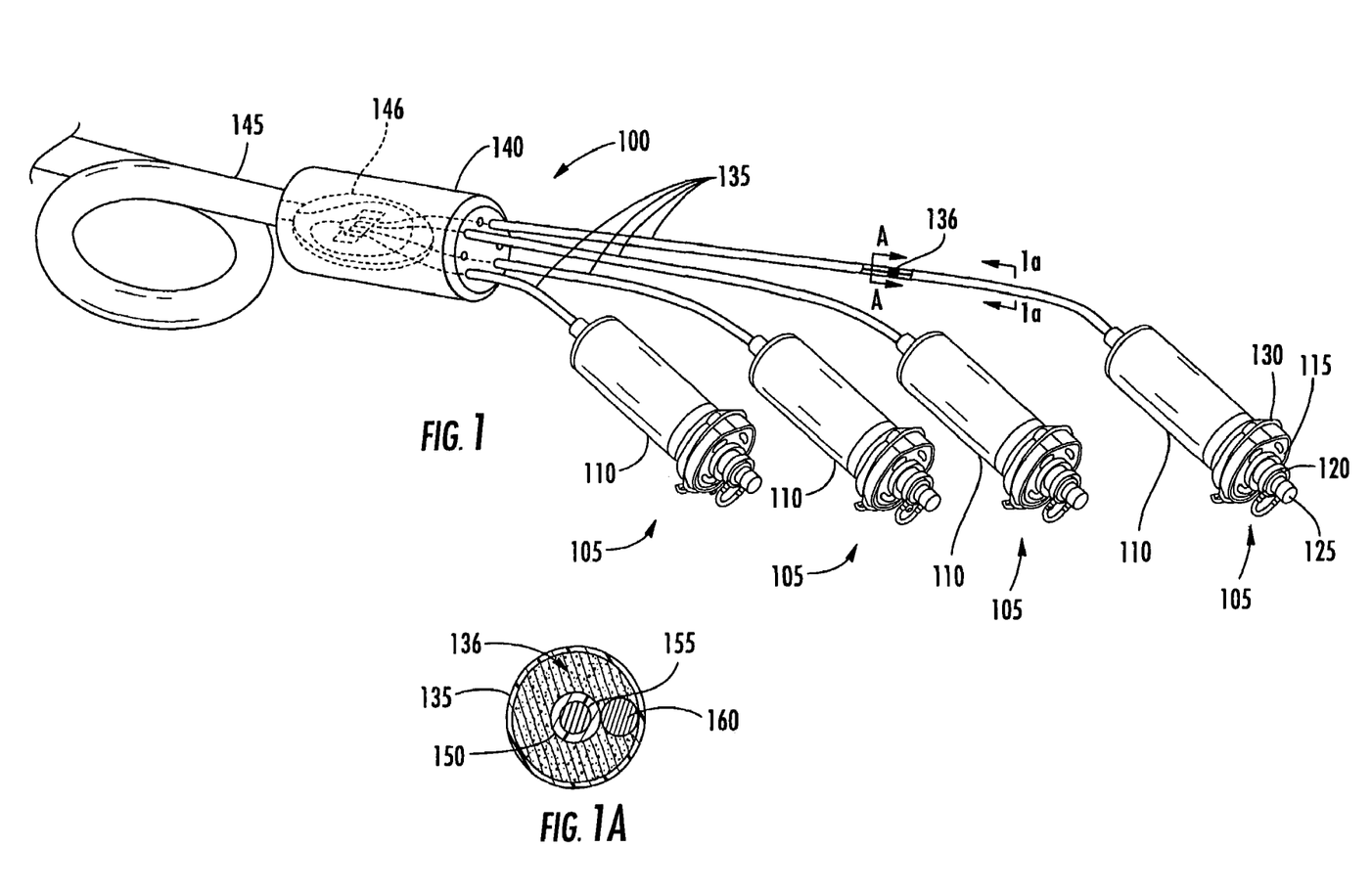
FIG. 1 is a perspective view illustrating an optical fiber termination assembly including a plurality of optical fiber termination apparatus according to some embodiments of the present invention.

Embodiments of the present invention will now be described with reference to the various embodiments illustrated in FIGS. 1-9. An optical fiber termination assembly 100 according to some embodiments of the present invention will now be described with reference to the perspective illustration of FIG. 1. As shown in FIG. 1, the optical fiber termination assembly 100 includes a plurality (four shown in FIG. 1) of optical fiber termination apparatus 105. Each of the optical fiber termination apparatus 105 is connected to an optical junction box 140 by a respective optical fiber tube 135 extending from the optical fiber termination apparatus 105 to the optical junction box 140. A termination optical fiber 155 extends through each of the optical fiber tubes 135 to an optical fiber splice member, such as the optical fiber splice tray 141 illustrated in dotted line in FIG. 1. The optical fiber splice tray 141 is configured to optically couple the optical fibers to respective source optical fibers extending into the optical junction box 140 as illustrated by the optical drop cable 145. The optical fiber termination apparatus 105 includes a housing 110, a connector adaptor 115 coupled to the housing 110 and a connector 120 positioned in the connector adaptor 115. The connector adaptor 115 has a connector opening configured to mate with a connector 120 of a predetermined connector type, such as an OptiTap™ connector.

Each of the optical fiber termination apparatus 105 shown in the embodiments of FIG. 1 is separately environmentally sealed from other of the optical fiber termination apparatus 105. As seen in FIG. 1, a cap 125 is provided on the connector 120 of each of the optical fiber termination apparatus 105 to close an associated fiber connection member opening into the housings 110. In addition, in some embodiments, a sealant 136 is placed in each of the optical fiber tubes 135 so that, if a cap 125 is left off of a particular connector 120 or the environmental sealing of the particular optical fiber termination apparatus 105 is otherwise breached, moisture or other environmental contaminants leaking into the breached optical fiber termination apparatus 105 may be prevented by the sealant 136 from passing back through to the optical junction box 140 and thereby contaminating other of the optical fiber termination apparatus 105.

As further seen in the embodiments of FIG. 1, the termination optical fiber 155 may be protected by an optical fiber casing 150 surrounding the optical fiber 155 with the casing 150 extending through and further protected by the optical fiber tube 135. In addition, a strength member 160 may extend through the optical fiber tube 135 to provide further support to protect the optical fiber 155. The strength member 160 may, in various embodiments of the present invention, be cloth, fiberglass or the like.

Also seen in the embodiments of FIG. 1 on each of the optical fiber termination apparatus 105 is a removable attachment member, shown as a spring member 130 in the embodiments of FIG. 1, that retains the connector adaptor 115 in the housing 110. The spring member 130 may be hand actuable, allowing removal and replacement of the connector adaptor 115 with a different configuration connector adaptor when a different predetermined connector type is to be used in the optical termination apparatus 105.

Figure 2:
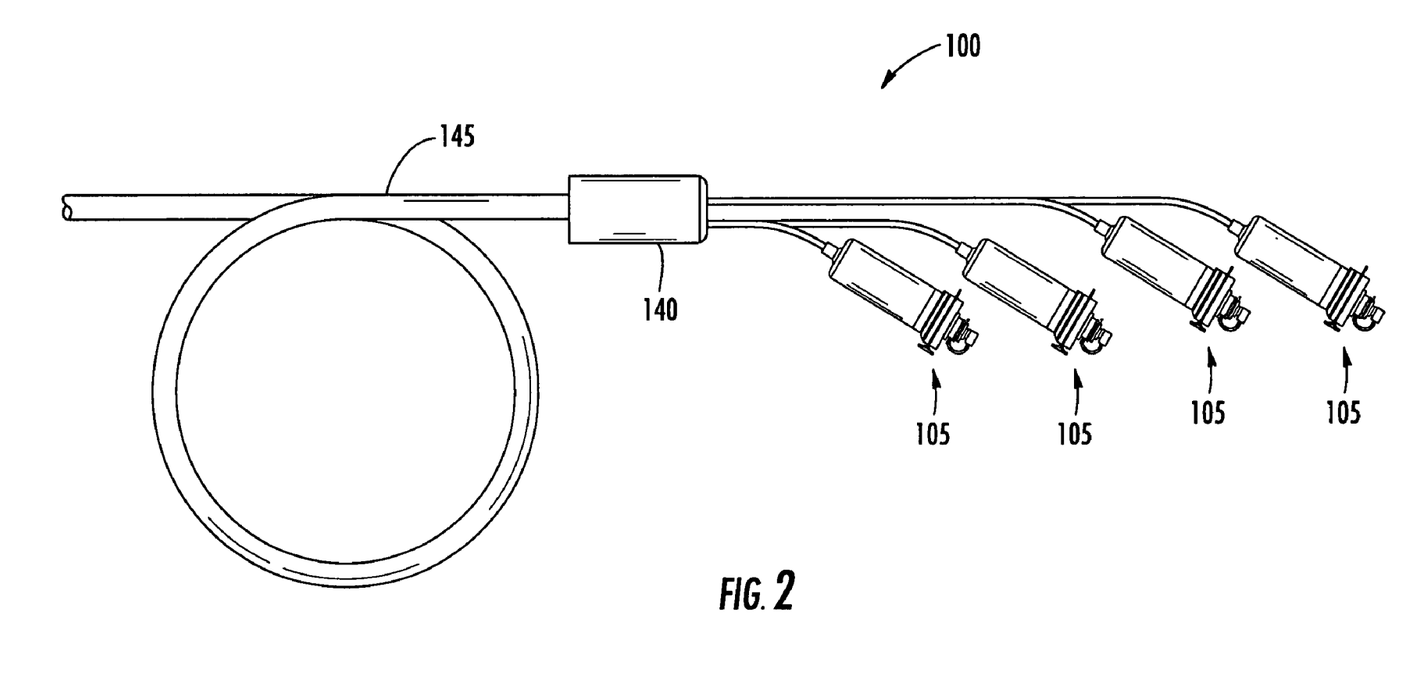
FIG. 2 is a side view of the assembly of FIG. 1.

Referring now to the side view of the assembly 100 in FIG. 2, the optical fiber tube length extending from between the optical junction box 140 and respective ones of the optical fiber termination apparatus may be variable. Such a configuration, as shown in FIG. 2, may allow for compact rolling or the like of the assembly 100 by spacing the respective optical fiber termination apparatus 105 from each other so that they may more readily be wound onto, for example, a spool of cable 145.

Figure 3:
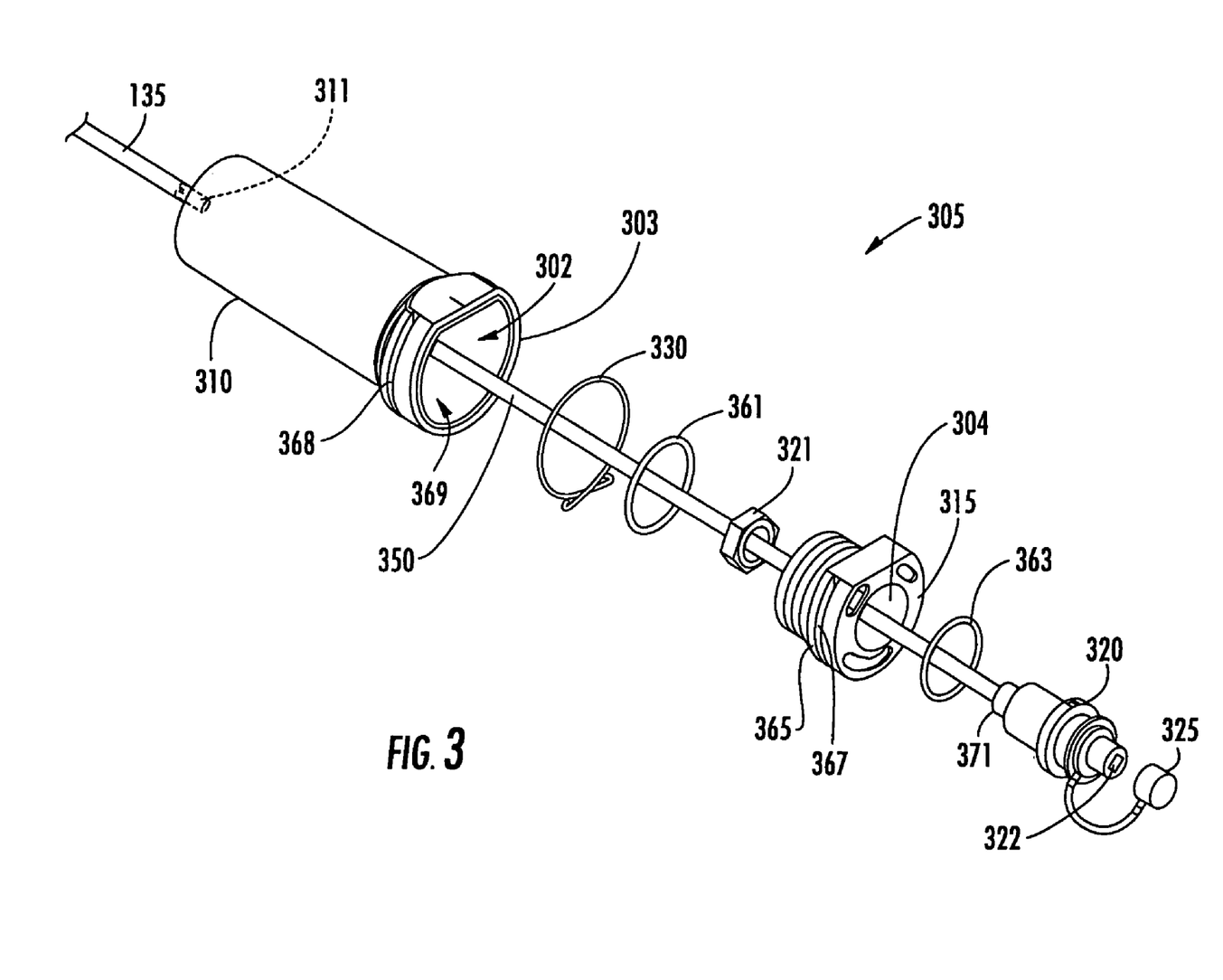
FIG. 3 is an exploded perspective view of an optical fiber termination apparatus according to some embodiments of the present invention.

Further embodiments of the present invention will now be described with reference to the exploded perspective view of FIG. 3. As shown in the embodiments of FIG. 3, an optical fiber termination apparatus 305 includes a housing 310 that defines an optical fiber receiving chamber 302. A connector adaptor 315 is received in a connector adaptor receiving opening 303 in the housing 310 that covers the optical fiber receiving chamber 302. An optical fiber receiving opening 311 in the housing 310 also extends into the optical fiber receiving chamber 302 and receives an optical fiber 350 from the optical fiber tube 135 into the optical fiber receiving chamber 302. A seal member, such as the O-ring 361, is positioned between an inner wall 369 of the housing 310 and the connector adaptor 315 to environmentally seal a gap between the housing 310 and the connector adaptor 315. As shown in the embodiments of FIG. 3, the O-ring 361 is received in the channel 365 of the connector adaptor 315.

Figure 7:
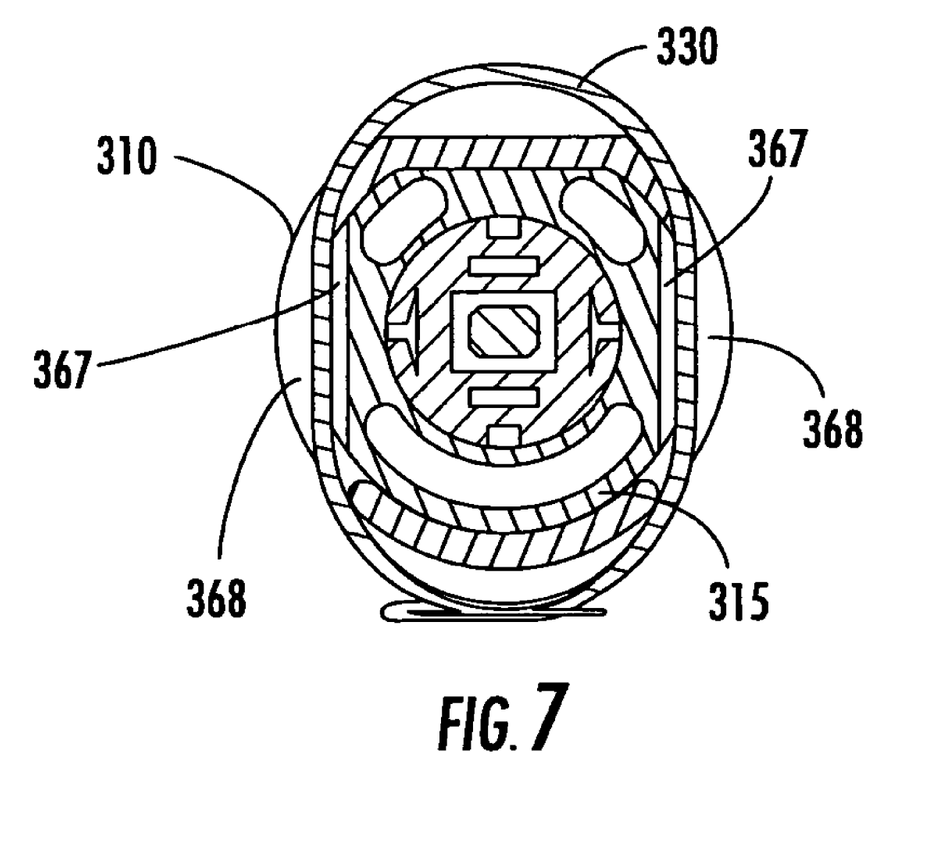
FIG. 7 is a cross-sectional view of the optical fiber termination apparatus of FIG. 3 taken along line CC.

A removable attachment member, such as the spring 330, is received in an opening 368 in the housing 310 and an opening 367 in the connector adaptor 315 to retain the connector adaptor 315 in the connector adaptor opening 303. As shown in the embodiments of FIG. 3, the opening 367 in the connector adaptor 315 is a channel. As seen in the embodiments of FIG. 7, the channel 367 and the opening 368 need not be symmetrically extending around the entire circumference of the housing 310 or connector adaptor 315 and may be separate channels in the outer surface on opposite sides of the respective connector adaptor 315 and/or housing 310.

Also illustrated in the embodiments of FIG. 3 is an optical fiber 350 (corresponding to the optical fiber 155 of FIG. 1) extending from the optical fiber tube 135 through the optical fiber receiving chamber 302 and ending in an optical fiber termination connector 371 on an end of the optical fiber 350. A connector 320 is received in a connector opening 304 of the connector adaptor 315. The connector opening 304 extends through the connector adaptor 315 from outside the housing 310 to the optical fiber receiving chamber 302.

As also shown in the embodiments of FIG. 3, a seal member, such as an O-ring 363, is positioned between the connector 320 and the connector adaptor 315 to provide an environmental seal therebetween. The illustrated connector 320 is secured against the O-ring 363 by an attaching means, such as the nut 320, which may be threadably received on the back side of the connector 320 to form a seal at the O-ring 363 and secure the connector 320 to the connector adaptor 315.

A cap 325 may be provided on the connector 320 to cover and environmentally seal a front side fiber connection member 322 of the connector 320 when no mating drop cable terminator is installed in the front fiber connection member 322. As such, in combination with the sealant 136 in the optical fiber tube 135 discussed with reference to FIG. 1, the O-ring 361, the O-ring 363, the cap 325 may provide for an environmentally sealed optical fiber receiving chamber 302 that may reduce or prevent the leakage of water or other environmental containments into the optical fiber receiving chamber 302. It will be understood, however, that the connector 320 need not be a functional connector and, instead may be another form of removable closure member positioned in the connector opening 304 to provide for environmental protection of the optical fiber receiving chamber 302 until some later time when an operative connector is installed therein.

Figure 4A:
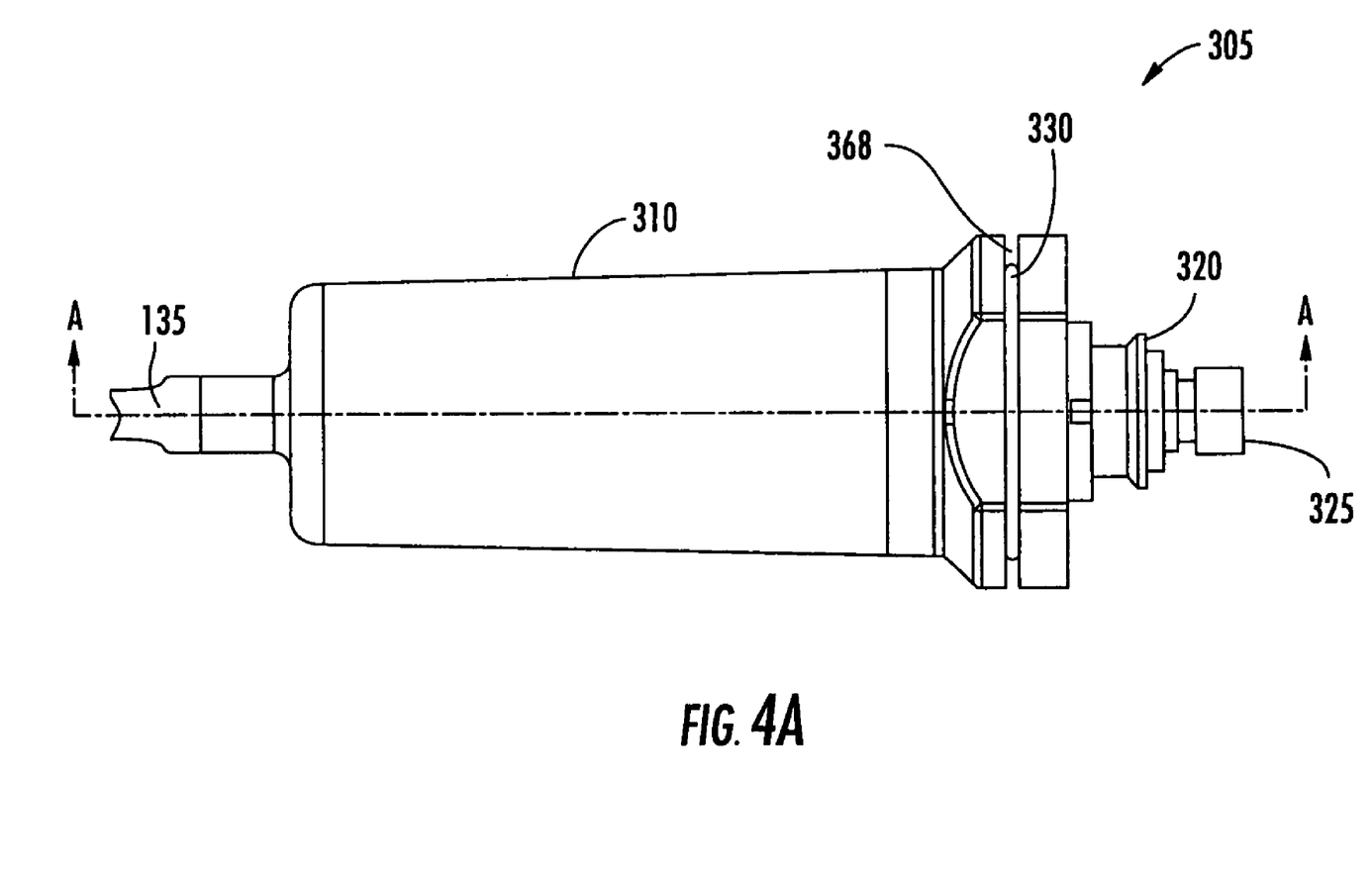
FIG. 4A is a top view of the optical fiber termination apparatus of FIG. 3.
Figure 4B:
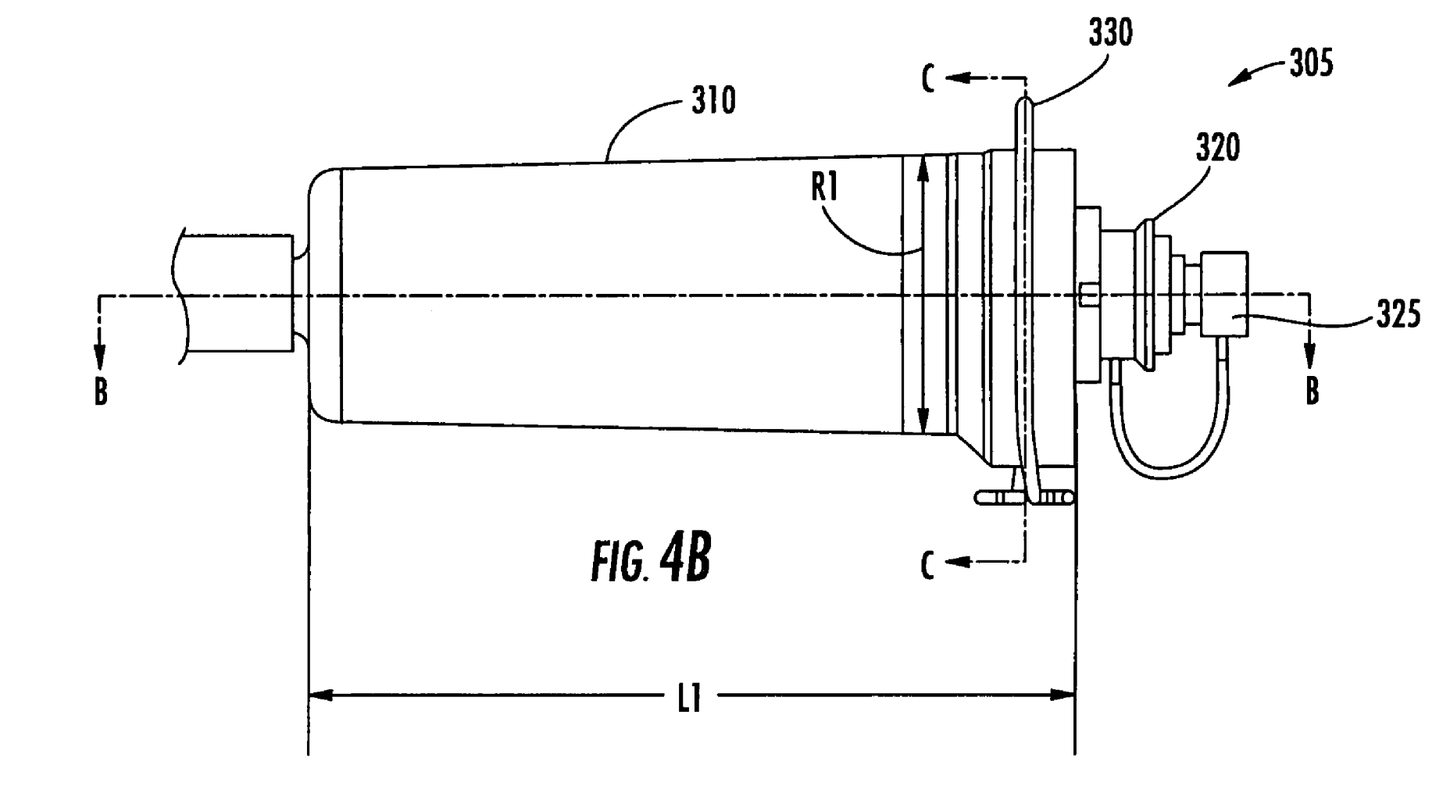
FIG. 4B is a side view of the optical fiber termination apparatus of FIG. 3.
Figure 4C:
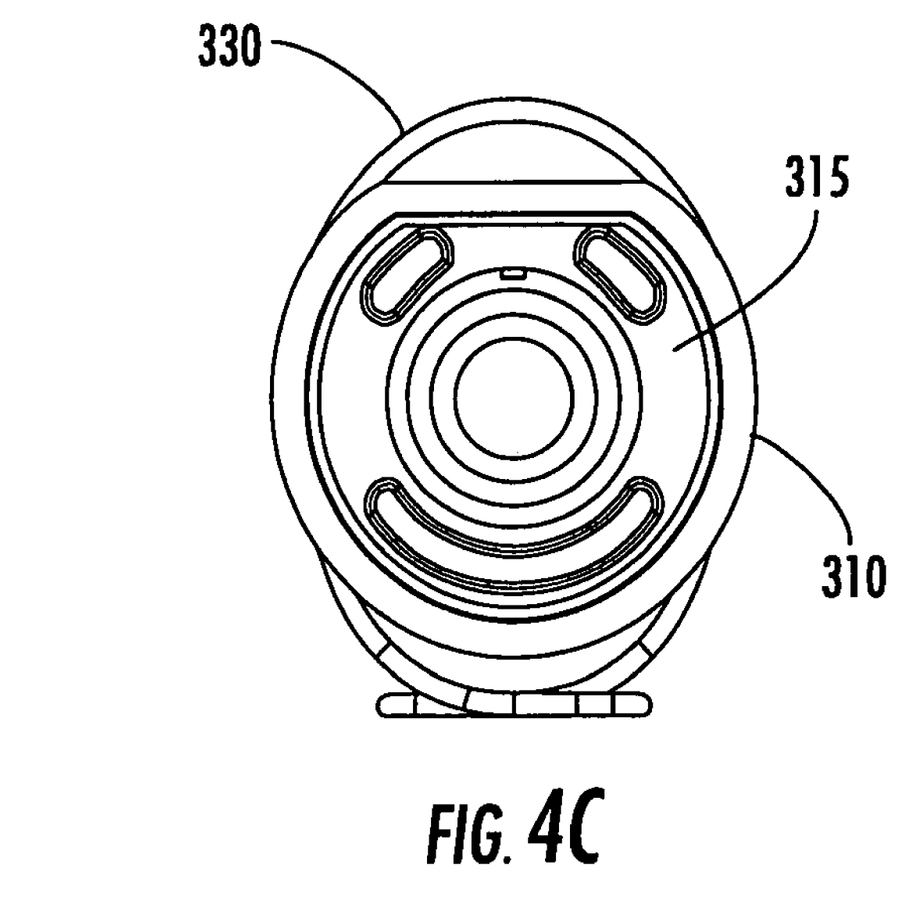
FIG. 4C is an end view of the optical fiber termination apparatus of FIG. 3.

The optical fiber termination apparatus 305 of the embodiments of FIG. 3 is further illustrated in the top view of FIG. 4A, the side view of FIG. 4B and the end view of FIG. 4C. As shown in FIG. 4A as compared with FIG. 4B an end of the housing 310 having the connector adaptor receiving opening 303 may be non uniform and may have a flattened area thereon.

Figure 5:
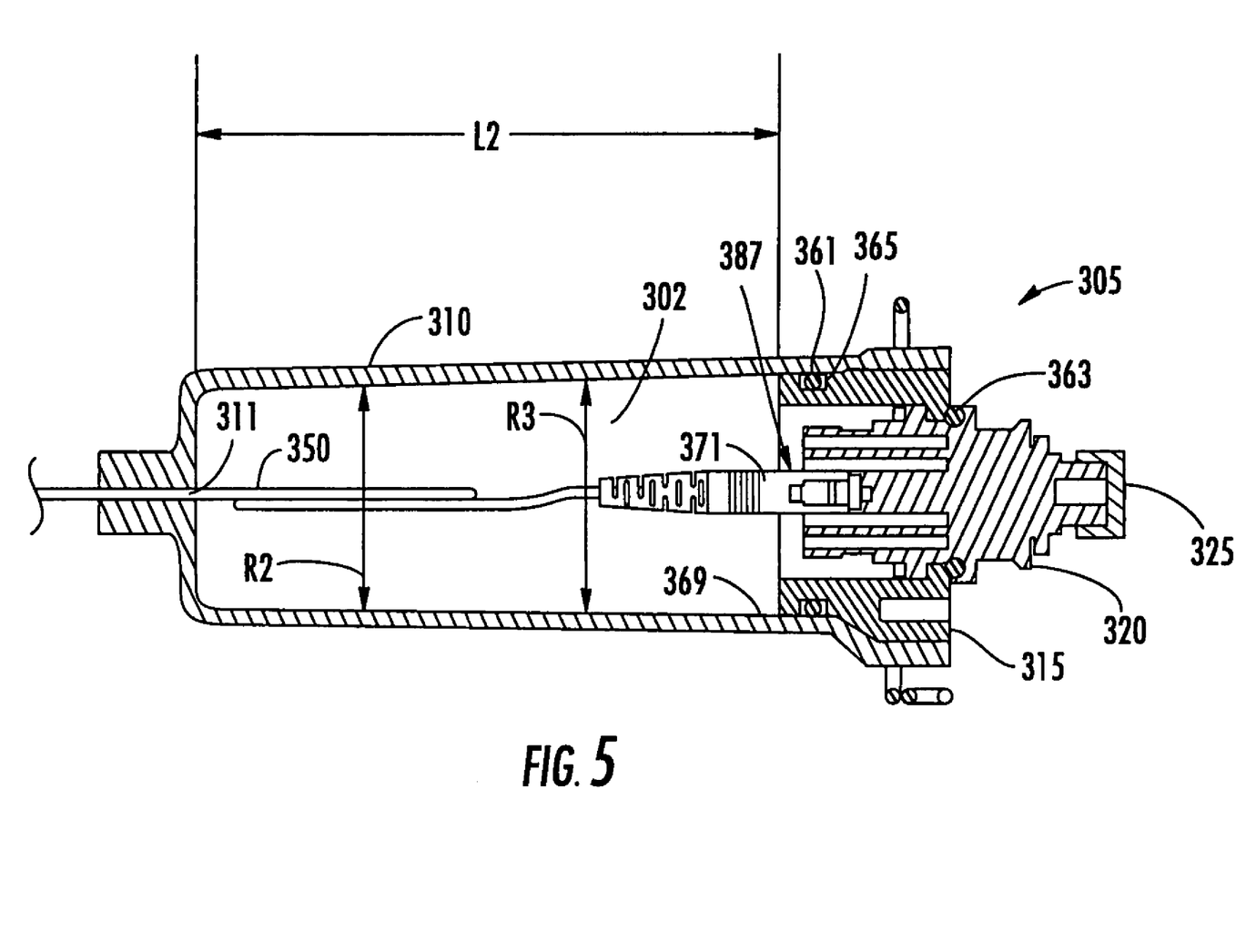
FIG. 5 is a cross-sectional view of the optical fiber termination apparatus of FIG. 3 taken along line AA.
Figure 6:
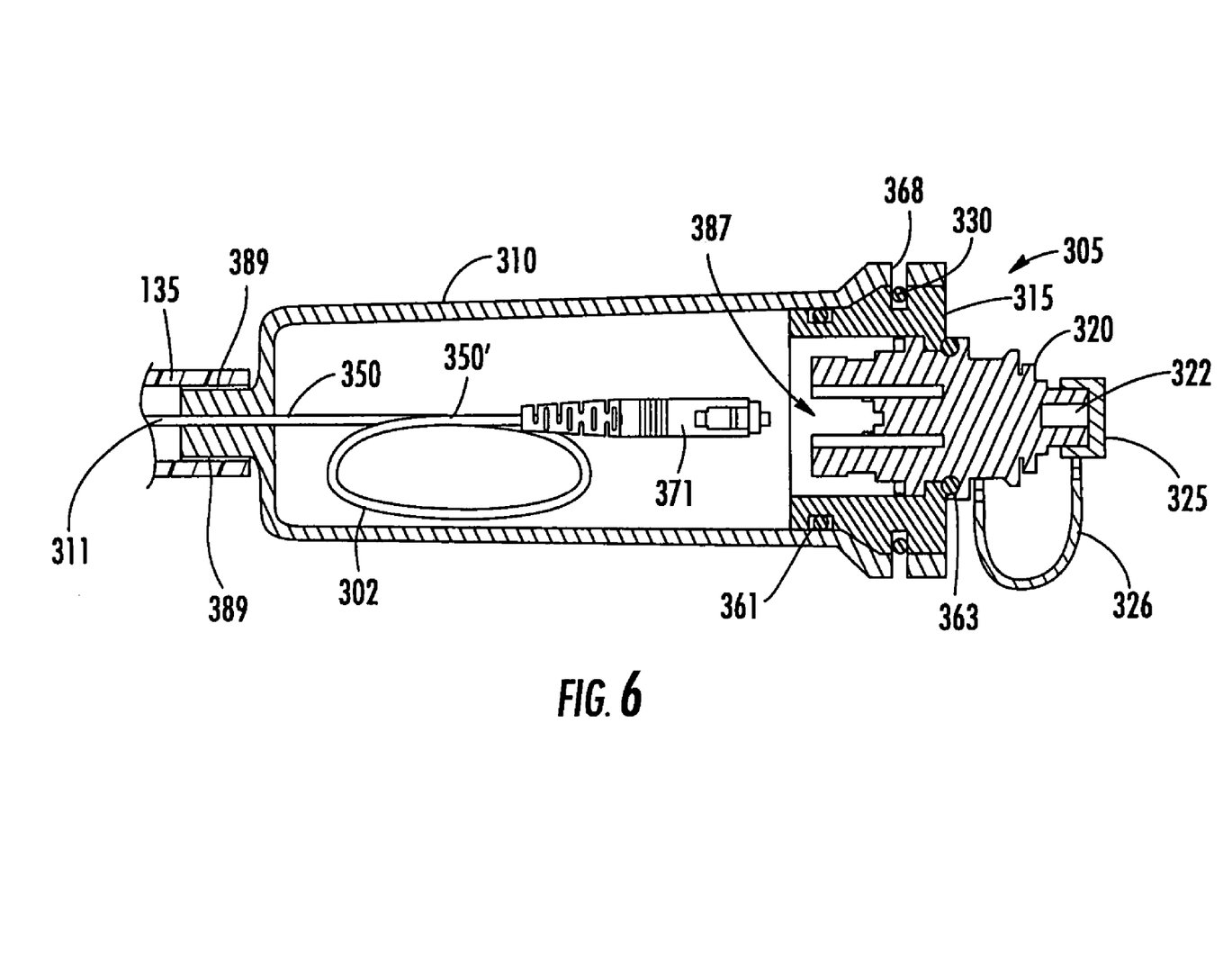
FIG. 6 is a cross-sectional view of the optical fiber termination apparatus of FIG. 3 taken along line BB.

Some embodiments of an optical fiber termination apparatus 305 will now be further described with reference to the cross sectional illustrations of FIGS. 5, 6, and 7. FIG. 5 is a cross sectional illustration taken along line AA of FIG. 4A. FIG. 6 is a cross sectional illustration taken along line BB in FIG. 4B. FIG. 7 is a cross sectional illustration taken along line CC in FIG. 4B. As seen in the embodiments of FIG. 5, the optical fiber receiving chamber 302 has a minimum diameter R2 at an end adjacent the optical fiber receiving opening 311 and tapers to a maximum diameter R3 of the optical fiber receiving chamber 302. The optical fiber 350 extends through the optical fiber receiving chamber 302 to the optical fiber termination connector 371. As illustrated in FIG. 5, the optical fiber termination connector 371 is received in a back fiber connection member 387 of the connector 320. FIG. 5 further illustrates the environmental seal arrangement of the O-ring 361 between the channel in the connector adaptor 315 and the inner surface 369 of the housing 310 as well as the positioning of the O-ring 363 between the connector 320 and the connector adaptor 315.

Referring now to FIG. 6, a loop 350' of the optical fiber 350 is shown received in the optical fiber receiving chamber 302. In some embodiments of the present invention, the optical fiber receiving chamber 302 is configured to receive and retain the loop 350' of optical fiber at a bend radius exceeding a minimum bend radius of the optical fiber. For example, the respective radius R2, R3 may be selected to provide the desired bend radius control of the loop 350' of the optical fiber 350. In some embodiments of the present invention, the loop 350' of optical fiber 350 is of sufficient length to allow removal of the connector adaptor 315 from the housing 310 to allow access to the back fiber connection member 387 of the connector 320 while retaining the loop 350' of the optical fiber 350 at a bend radius exceeding the minimum bend radius of the optical fiber 350. As such, access to the back fiber connection member 387 for insertion and removal of the optical fiber termination connector 371 and for cleaning of the back fiber connection member 387 may be facilitated without further disturbance of the integrity of the optical fiber 350. Note that, for purposes of illustration, the optical fiber termination connector 371 is shown in FIG. 6 as being removed from the back fiber connection member 371 of the connector 320.

Referring now to FIG. 7, attachment of the connector adaptor 315 in the connector adaptor receiving opening 303 will be further described. As shown in the cross-sectional illustration of the embodiments of FIG. 7, the spring 330 extends through the channel openings 368 in opposite sides of the housing 310 and into channel openings 367 in opposite sides of the connector adaptor 315 so as to contact portions of respective faces of the housing 310 and the connector adaptor 315 to limit movement of the connector adaptor 315 from the housing 310. The connector adaptor 315 may, thereby, be retained in position in the housing 310 while the spring 330 may be actuated to remove the arms thereof from the respective channel openings 367, 368, to allow removal and, where desired, replacement, of the connector adaptor 315 with another connector type connector adaptor.

Also shown in the view of FIG. 6 is an optical fiber tube 135 connected to the housing 310. As shown in the embodiments of FIG. 6, a seal, such as an adhesive 389, is positioned between the optical fiber tube 135 and the optical fiber receiving opening 311 of the housing 310. As such, the optical fiber receiving chamber 302 may be environmentally sealed by the O-ring 363 positioned between the connector 320 and the connector opening 304 of the connector adaptor 315, the adhesive seal 389 between the optical fiber tube 135 and the optical fiber receiving opening 311 and the sealant 136 (FIG. 1) in the optical fiber tube 135. Furthermore, the sealant 136 in the optical fiber tube 135 for a respective optical fiber termination apparatus 305 may prevent or limit opening of the front fiber connection member 322 by removal of the cap 325 from breaking the environmental seal of the optical fiber receiving chamber 302 of other housings 310. A retaining cord 326 is shown coupling the cap 325 to the connector 320 that may be used to limit the risk of loss of the cap 325 if removed from its position covering the front fiber connection member 322.

As described with reference to the embodiments in FIG. 3-7, each of the housings 310 may be configured to receive only a single connector 320. However, with an assembly 100, as shown in FIG. 1, a plurality of respective source optical fibers may extend from an optical drop cable 145 into the optical junction box 140, where they may be coupled in the optical fiber splice tray 141 to termination optical fibers 155 extending to respective ones of the optical fiber termination apparatus housings 110. In combination with the seal 136 and a single connector 120 associated with each housing 110, opening of the environmental seal for an individual connector/optical fiber may be prevented from causing breach of the environmental protection of other individual connectors 120 by limiting the danger of incursion of environmental contaminants, such as water, into the optical junction box 140. The optical drop cable 145 may couple to an optical distribution source, such as a telecommunications service provider.

As discussed above, different connector adaptors 315 may be provided for different predetermined connector types to allow flexibility in the types of connectors 120, 320 utilized with the optical fiber termination apparatus 105, 305 of the present invention. As such, various embodiments of the present invention may be directed to optical fiber termination kits including a plurality of connector adaptors for different predetermined connector types.

Figure 8:
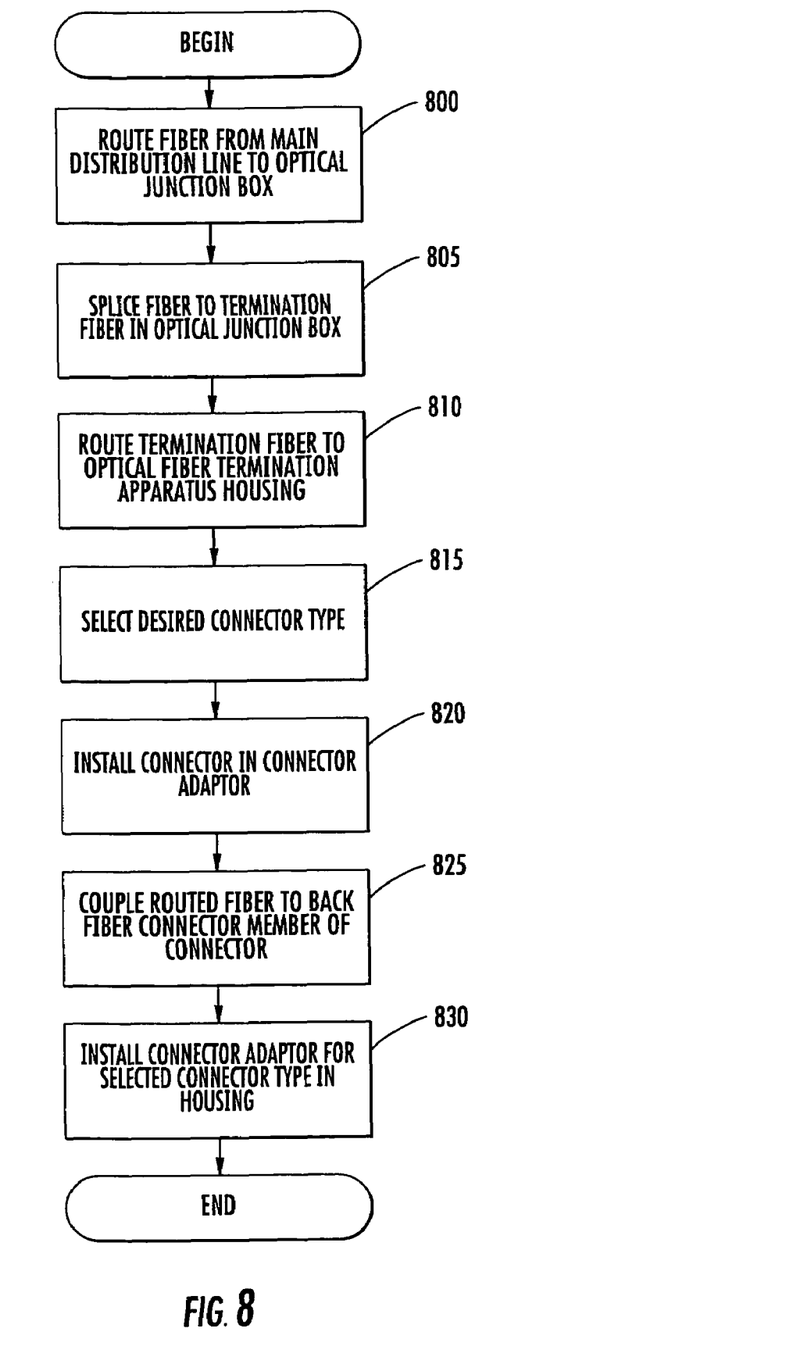
FIG. 8 is a flowchart illustrating operations for terminating an optical fiber according to some embodiments of the present invention.

Methods of terminating optical fibers according to various embodiments of the present invention will now be described with reference to the flow chart illustrations of FIG. 8. As shown in FIG. 8, operations begin by routing an optical fiber from a main distribution line to an optical fiber termination apparatus housing 110, 310, as will be described for the particular embodiments in FIG. 8 with reference to Blocks 800-810. As shown at Block 800, an optical fiber is routed from the main distribution line to an optical junction box 140, for example, using an optical drop cable 145. The optical fiber from the main distribution line is spliced to a termination optical fiber 155 in the optical junction box 140 (Block 805). The termination optical fiber 155 is routed to the optical fiber termination apparatus housing 110 (Block 810).

A desired connector type for terminating the routed optical fiber is selected (Block 815). For example, an OptiTap™ connector type may be selected. A connector 120, 320 of the selected connector type is installed in a connector adaptor 115, 315 having a connector opening therein configured to mate with the selected connector type (Block 820). The routed optical fiber is coupled to a back fiber connection member 387 of the connector 120, 320 of the selected connector type (Block 825). The connector adaptor 115, 315 is installed in the housing 110, 310 (Block 830).

While described with reference to FIG. 8 in terms of a single optical fiber, it will be understood that a plurality of optical fibers may be routed from the main distribution line to the optical junction box 140 and spliced to respective termination optical fibers 155 is shown in FIG. 1. As such, routing the termination optical fibers 155 may include routing respective ones of the termination optical fibers 155 to the optical fiber termination apparatus housings 110 to provide a multi-drop connection from the main distribution line.

Figure 9:
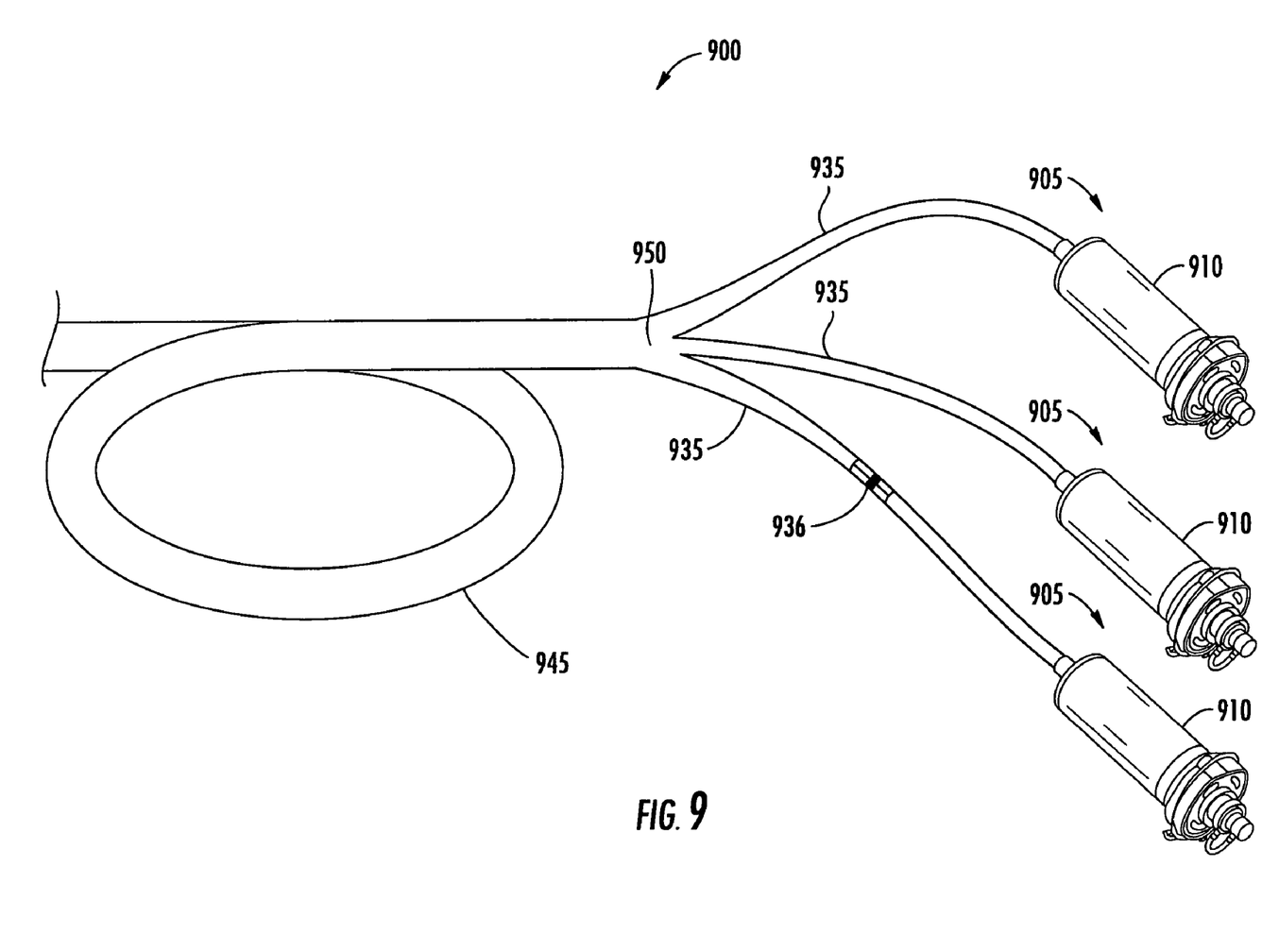
FIG. 9 is a perspective view illustrating an optical fiber termination assembly including a plurality of optical fiber termination apparatus according to further embodiments of the present invention.

Operations for routing an optical fiber described with reference to Blocks 800-810 in FIG. 8 were directed to an assembly, such as the assembly 100 illustrated in FIG. 1. Alternative embodiments of an optical fiber termination assembly 900 are illustrated in FIG. 9. For the embodiments in FIG. 9, a split tube configuration having a split region 950 is utilized to provide a multi-drop connection configuration, rather than the optical junction box 140. As such, the optical drop cable 945 extends to the splitter region 950 where it is singulated into respective optical fiber tubes 935, each of which may be environmentally sealed from others by a sealant 936 place therein between the optical fiber termination apparatus 905 and the splitter region 950. For embodiments such as those illustrated in FIG. 9, operations related to routing an optical fiber from the main distribution line to the optical fiber termination apparatus housing 905 may include separating a plurality of optical fibers from the main distribution line and singulating the respective separated optical fibers. Respective ones of the singulated optical fibers may then be routed to different optical fiber termination apparatus housings 910 to provide a multi-drop connection from the main distribution line. Note that the embodiments illustrated in FIG. 9 further differ from those in FIG. 1 in that only a three point multipoint drop is shown. However it is to be understood that, for the embodiments in FIG. 1 and in FIG. 9, a different number of connector points may be provided at the multipoint drop based, for example, on the requirements of a particular customer application.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. An optical fiber termination apparatus, comprising:
   a housing defining an optical fiber receiving chamber and having a connector adaptor receiving opening, wherein the optical fiber receiving chamber is configured to receive and retain a loop of optical fiber at a bend radius exceeding a minimum bend radius of the optical fiber;
   a connector adaptor positioned in the connector adaptor receiving opening and having a connector opening therein extending from outside the housing to the optical fiber receiving chamber, the connector opening being configured to mate with a connector of a predetermined connector type; a seal member positioned between an inner wall of the housing and the connector adaptor to seal a gap therebetween; and a removable attachment member that retains the connector adaptor in the connector adaptor receiving opening, wherein the removable attachment member comprises a spring member and wherein the housing and the connector adaptor each have an opening therein for receiving the spring member; and
   a removable attachment member that retains the connector adaptor in the connector adaptor receiving opening.

2. The apparatus of claim 1 further comprising at least one of the connector or a removable closure member in the connector opening that closes the connector opening.

3. The apparatus of claim 1 wherein the opening in the connector adaptor comprises a first channel in an outer surface thereof and a second channel in the outer surface thereof on an opposite side of the connector adaptor.

4. The apparatus of claim 1 wherein the optical fiber receiving chamber is configured to receive a length of the optical fiber sufficient to allow removal of the connector adaptor from the housing to allow access to a back fiber connection member of the connector while retaining the loop of optical fiber at a bend radius exceeding the minimum bend radius of the optical fiber.

5. The apparatus of claim 4 wherein the housing includes an optical fiber receiving opening therein extending into the optical fiber receiving chamber.

6. An optical fiber termination apparatus, comprising:
   a plurality of housings, each defining an optical fiber receiving chamber and having a connector adaptor receiving opening;
   a connector adaptor positioned in the connector adaptor receiving opening of each of the housings and having a connector opening therein extending from outside the housing to the optical fiber receiving chamber, the connector opening of each connector adaptor being configured to mate with a connector of a predetermined connector type;
   an optical junction box;
   an optical fiber tube extending from the optical fiber receiving opening of each of the housings to the optical junction box;
   an optical fiber extending through each of the optical fiber tubes between the optical junction box and the plurality of housings; and
   an optical fiber splice member in the optical junction box configured to optically couple the optical fibers to respective source optical fibers extending into the optical junction box.

7. The apparatus of claim 6 wherein the optical fiber receiving chamber is configured to receive and retain a loop of optical fiber at a bend radius exceeding a minimum bend radius of the optical fiber.

8. The apparatus of claim 6 wherein the optical fiber splice member comprises an optical fiber splice tray.

9. The apparatus of claim 6 further comprising an optical fiber termination connector on an end of the optical fiber in each of the plurality of housings, the optical fiber termination connector being configured to releasably couple to the back fiber connection member.

10. The apparatus of claim 9 further comprising a sealant in each of the tubes between the respective housings and the optical junction box.

11. The apparatus of claim 10 further comprising the connector positioned in the connector opening, the connector having a closable front fiber connection member on a face thereof extending from the housing and wherein the optical fiber receiving chamber is environmentally sealed when the front fiber connection member is closed.

12. The apparatus of claim 11 further comprising, for each housing, a seal member positioned between the connector and the connector opening and a seal between the optical fiber tube and the optical fiber receiving opening and wherein the optical fiber receiving chamber is environmentally sealed by the seal member positioned between the connector and the connector opening, the seal between the optical fiber tube and the optical fiber receiving opening and the sealant in the optical fiber tube and wherein opening the front fiber connection member on the connector of one of the housings will not break the environmental seal for other of the housings.

13. The apparatus of claim 12 wherein the seal between the optical fiber tube and the optical fiber receiving opening comprises an adhesive and the seal member positioned between the connector and the connector opening comprises an O-ring.

14. The apparatus of claim 12 wherein each of the housings is configured to receive only a single connector.

15. The apparatus of claim 6 wherein the respective source optical fibers extending into the optical junction box comprise an optical drop cable coupled to an optical distribution source.

16. A method of terminating optical fiber comprising:
routing an optical fiber from a main distribution line to an optical fiber termination apparatus housing;
selecting a desired connector type for terminating the routed optical fiber; installing a connector of the selected connector type in a connector adaptor having a connector opening therein configured to mate with the selected connector type;
coupling the routed optical fiber to a back fiber connection member of the connector; and
installing the connector adaptor in the housing.

17. The method of claim 16 wherein routing an optical fiber comprises:
routing the optical fiber from the main distribution line to an optical junction box; splicing the optical fiber from the main distribution line to a termination optical fiber in the optical junction box; and
routine the termination optical fiber to the optical fiber termination apparatus housing.

18. The method of claim 17 wherein a plurality of optical fibers are routed from the main distribution line to the optical junction box and spliced to respective termination optical fibers and wherein routing the termination optical fiber comprises routing respective ones of the termination optical fibers to different optical fiber termination apparatus housings to provide a multi-drop connection from the main distribution line.

19. The method of claim 18 further comprising providing environmental sealing of the routing of the respective termination optical fibers configured so that breach of the environmental sealing for one of the termination optical fibers will not break the environmental sealing for other of the termination optical fibers.

20. The method of claim 16 wherein routing an optical fiber comprises:
separating a plurality of optical fibers from the main distribution line;
singulating the respective separated optical fibers; and
routing respective ones of the singulated optical fibers to different optical fiber termination apparatus housings to provide a multi-drop connection from the main distribution line.

\* \* \* \* \*